2,738,341
RESINOUS COMPOUNDS BY CONDENSING PEROXIDES WITH ALKENE THIOLS

Arnold L. Ayers, Idaho Falls, Idaho, and Cleveland R. Scott, Bartlesville, Okla., assignors to Phillips Petroleum Company, a corporation of Delaware No Drawing. Application January 3, 1952, Serial No. 264,832

12 Claims. (Cl. 260—79.7)

This invention relates to novel resinous compounds and provides a process for their preparation.

Although in general synthetic resins are long chain hydrocarbon polymers formed by condensation polymerization or vinyl polymerization, oxygen, nitrogen, or sulfur may also be present in the chains. By the practice of this invention a novel resin containing oxygen and sulfur is provided.

In accordance with an embodiment of this invention highly insoluble thermoplastic resins and semi-fluid resins or resinous compounds can be prepared by subjecting unsaturated aliphatic mercaptans to the action of a peroxide or hydroperoxide at a temperature necessary to start the exothermic reaction.

Our resinous compounds are believed to be particularly novel because of the active hydrogen atom on the sulfur atom in the —SH group of the mercaptan which is reacted with a peroxide in accordance with this invention. Besides polymerization, oxidation reactions, for example disulfide forming reactions, sulfonic acid formation and the like are believed to result from the reaction with the peroxide or hydroperoxide.

Mercaptans especially applicable to this invention include unsaturated aliphatic mercaptans containing from 3 to 10 carbon atoms, for example 2-propene-1-thiol (allyl mercaptan) hexylenethiol, octylenethiol and the alkadiene thiols. Inasmuch as these mercaptans and methods for their preparation are well known in the art their production need not be discussed at length. Further, non-hydrocarbon substituents which are inert to the reaction can be present in the unsaturated mercaptan chain. One method for preparing these aliphatic mercaptans is by the reaction of suitable halides with corresponding hydrosulfides, for example 1-bromo-3,5-dimethyl-2-heptene and potassium acid sulfide in alcoholic solution give 3,5-dimethyl-2-heptenethiol. Unsaturated aliphatic mercaptans can also be prepared by hydrolysis of the corresponding thiol esters. Another method is by the addition of hydrogen sulfide to a diolefin.

Among the peroxides which can be used are hydrogen peroxide, organic peroxides, for example benzoyl peroxide, and organic hydroperoxides, e. g. cumene hydroperoxide. In addition alkali metal and alkaline earth metal peroxides, say sodium peroxide or barium peroxide can be used. The peroxides can be represented by the single formula ROOR wherein R is a hydrogen atom or an organic radical, and MOOM wherein M is a metal selected from alkali and alkaline earth metals. More specifically the two groups of organic peroxides have the formulas ROOH, known has hydroperoxides or hydroperoxymethanes, and ROOR where R in each instance is an organic radical. The R can be completely hydrocarbon in character, and can be of mixed character, such as alkyl, aryl, alkaryl, aralkyl, and the like, and can also have non-hydrocarbon substituents, for example oxygen, in the form of hydroxy and ether compounds, sulfur in similar compounds (i. e. mercapto compounds and thioethers), and halogen compounds. Examples of such peroxides are diethyl peroxide, ditertiarybutylperoxide, dibenzoyl peroxide, diisopropyl hydroperoxide, 1-methyl-1-hydroperoxy-cyclopentane, tetralin hydroperoxide, phenylcyclohexane, hydroperoxide, octahydrophenanthrene hydroperoxide, diisopropylbenzene hydroperoxide (dimethyl(isopropylphenyl)-hydroperoxymethane), methylethyl(ethoxyphenyl)hydroperoxymethane, methyldecyl(methylphenyl)hydroperoxymethane, dimethyldecylhydroperoxymethane, methylchlorophenylphenylhydroperoxymethane, and tertiarybutylisopropylbenzene hydroperoxide(dimethyl(tertiary-butylphenyl)hydroperoxymethane).

As indicated, when the peroxide or hydroperoxide is added to the mercaptan in accordance with this invention the reaction, once started, is exothermic. In some cases the reaction is immediate at room temperature while in others the mixture must be gently warmed to start the reaction. The temperature to be employed, therefore, can vary anywhere from 30° F. to 200° F., and of course temperatures outside this range which result in resin formation can be used if desired. Reaction periods are of short duration, that is, of the order of several seconds to about 30 minutes in length. Atmospheric pressures are generally satisfactory; however higher pressures can be employed if desired.

We have found that, as a rule, the degree of hardness of the resin can be varied by varying the mol ratio of mercaptan to peroxide or hydroperoxide. Although some of the peroxides may lead to exceptions, in general, when the mol ratio of peroxide compound to mercaptan is high, say above 1:2 the resin formed is hard and insoluble. When the ratio of mercaptan to peroxide compound is around 1:1 a waxy or oily petrolatum-like product is formed. Broadly the reactants are employed in a mol ratio of mercaptan to peroxide compound of about 1:1 to 1:8.

Thus in accordance with the instant invention a novel thermoplastic resin is prepared by reacting an unsaturated aliphatic mercaptan containing from 3 to 10 carbon atoms with a peroxide selected from the group consisting of MOOM and ROOR wherein M is a metal selected from alkali and alkaline earth metals and R is selected from the group consisting of hydrogen and organic radicals.

The resins disclosed herein are particularly useful because they can be shaped by extrusion. Resins formed by extrusion are used in making continuous tubing, continuous sheets and rods.

The following examples are illustrative of resinous compounds and processes for preparing them in accordance with this invention. The examples are, of course, intended to be illustrative of the invention since different embodiments can be made without departing from the spirit of this invention. Such modifications and variations will occur to those skilled in the art. Allyl mercaptan was used because of its availability, but the other unsaturated mercaptans discussed herein also form resins in accordance with the invention.

Example 1

Allyl mercaptan and 30 per cent aqueous hydrogen peroxide in approximately equimolar amounts were added to a flask and gently heated. An extremely exothermic reaction ensued and a white resin-like material was formed which was molded into a pellet at 150° C. and 4000 pounds pressure. The resin was insoluble in carbon tetrachloride, carbon disulfide, methanol, ethanol, acetone, hexane, heptane and octane. It was unaffected by dilute hydrochloric, nitric, and sulfuric acids. It was slightly discolored by hot 10 per cent aqueous sodium hydroxide.

Example 2

2 cc. of allyl mercaptan (0.025 mol based on a density of 0.93 for allyl mercaptan) were mixed with 5 cc. of 30 per cent hydrogen peroxide (0.0633 mol) and warmed sufficiently to start the reaction. This mixture of hydrogen peroxide and allyl mercaptan in a ratio of 2½ mols of hydrogen peroxide to 1 mol of mercaptan lead to a very vigorous exothermic reaction, and to the formation of a very hard resin.

*Example 3*

2 cc. of allyl mercaptan (0.025 mol) were reacted with 2 cc. of 30 per cent hydrogen peroxide (0.0254 mol) in accordance with Example 1. This mol ratio of 1 mol of allyl mercaptan to 1 mol of hydrogen peroxide gave a petrolatum-like product which was white in color.

*Example 4*

In order to compare with the resin prepared in Example 3 wherein approximately equimolar quantities of allyl mercaptan and hydrogen peroxide were used, 10 cc. of allyl alcohol, 0.147 mol, were mixed with 10 cc. of 30 per cent hydrogen peroxide, 0.1295 mol, and heated on a hot plate for about 40 minutes. Boiling reduced the volume considerably. However there was no observable reaction as in Example 3 where a petrolatum-like product was produced.

*Example 5*

2 grams of benzoyl peroxide and 2 grams of allyl mercaptan were reacted in accordance with Example 1. The characteristic odor of allyl disulfide was not observed but the resulting product was a soft mass.

*Example 6*

Allyl mercaptan and benzoyl peroxide in a mol ratio of between 1:5 and 1:6 were added to a flask and heated to a temperature in the range of 100 to 200° F. A dark resinous solid was formed.

*Example 7*

Allyl mercaptan and cumene hydroperoxide in a mol ratio of between 1:1 and 1:1.5 were added to a flask and heated to a temperature in the range of 100 to 200° F. A heavy, dark viscous oil was formed which was nearly solid.

*Example 8*

Allyl mercaptan and sodium peroxide in a mol ratio of between 1:1 and 1:1.5 were added to a flask. On standing at room temperature for 15 minutes, the mixture became very viscous.

We have been unable to determine the exact chemical composition of our novel resins because we have been having great difficulty in getting our resins into solution. It has been impossible to find a solvent enabling us to make exact analysis. However, data obtained thus far on the resin prepared in accordance with Example 1 shows the resulting resin to contain 34.24 weight per cent carbon, 5.8 weight per cent hydrogen and 30.4 weight per cent sulfur. Oxygen determined by difference was 29.56 weight per cent. This was found to be in fair agreement with the value obtained in a subsequent analysis which was 32.94 weight per cent oxygen. Since the resins prepared in accordance with our invention contain high amounts of both oxygen and sulfur it is safe to conclude that a series of reactions has taken place to result in our novel resins.

Other embodiments than those specifically set forth herein will naturally occur to those skilled in the art. Such variations are deemed in the scope of our invention.

We claim:

1. A process for the production of a moldable solid resinous product which comprises reacting an alkene thiol having from 3 to 10 carbon atoms with hydrogen peroxide, the reactants being charged in mol ratio of from 1:1 to 1:8 and at a temperature of from 30° F. to 200° F.

2. A process for the production of a moldable solid resinous product which comprises reacting an alkene thiol having from 3 to 10 carbon atoms with benzoyl peroxide, the reactants being charged in mol ratio of from 1:1 to 1:8 and at a temperature of from 30° F. to 200° F.

3. A process for the production of a moldable solid resinous product which comprises admixing an alkene thiol having from 3 to 10 carbon atoms with hydrogen peroxide in a 1:1 to 1:8 mol ratio and heating the mixture to start the reaction of the two compounds.

4. A process for the production of a moldable solid resinous product which comprises reacting allyl mercaptan with hydrogen peroxide in a mol ratio of 1:1.2 and heating the mixture to start the reaction of the two compounds.

5. A process for the production of a moldable solid resinous product which comprises reacting allyl mercaptan with benzoyl peroxide in a mol ratio of 1:5 and heating the mixture to start the reaction of the two compounds.

6. A moldable solid resinous product formed by reacting an alkene thiol having from 3 to 10 carbon atoms with hydrogen peroxide, the reactants being charged in mol ratio of from 1:1 to 1:8 and at a temperature of from 30° F. to 200° F.

7. A moldable solid resinous product formed by reacting an alkene thiol having from 3 to 10 carbon atoms with benzoyl peroxide, the reactants being charged in mol ratio of from 1:1 to 1:8 and at a temperature of from 30° F. to 200° F.

8. A moldable solid resinous product formed by admixing an alkene thiol having from 3 to 10 carbon atoms with hydrogen peroxide in a 1:1 to 1:8 mol ratio and heating the mixture to start the reaction of the two compounds.

9. A moldable solid resinous product formed by reacting allyl mercaptan with hydrogen peroxide in a mol ratio of 1:1.2 and heating the mixture to start the reaction of the two compounds.

10. A moldable solid resinous product formed by reacting allyl mercaptan with benzoyl peroxide in a mol ratio of 1:5 and heating the mixture to start the reaction of the two compounds.

11. A process for the production of a moldable solid resinous product which comprises admixing an alkene thiol having from 3 to 10 carbon atoms with a peroxidic material selected from the group consisting of hydrogen peroxide and benzoyl peroxide in a 1:1 to 1:8 mol ratio and heating the mixture to start the reaction of the two compounds.

12. A moldable solid resinous product formed by admixing an alkene thiol having from 3 to 10 carbon atoms with a peroxidic material selected from the group consisting of hydrogen peroxide and benzoyl peroxide in a 1:1 to 1:8 mol ratio and heating the mixture to start the reaction of the two compounds.

References Cited in the file of this patent

UNITED STATES PATENTS

| | | |
|---|---|---|
| 2,097,155 | Groll et al. | Oct. 26, 1937 |
| 2,125,649 | Reppe et al. | Aug. 2, 1938 |
| 2,125,685 | Nicodemus et al. | Aug. 2, 1938 |
| 2,136,178 | Carothers et al. | Nov. 8, 1938 |
| 2,594,579 | Novotny et al. | Apr. 29, 1952 |

OTHER REFERENCES

Braun Berichte, vol. 59, pages 1207–1209 (1926).